United States Patent
Nakajima et al.

(10) Patent No.: US 8,971,781 B2
(45) Date of Patent: *Mar. 3, 2015

(54) ROLLER FOR IMAGE-FORMING APPARATUS AND PROCESS FOR PRODUCING THE SAME

(71) Applicants: Sumitomo Electric Industries, Ltd., Osaka-shi, Osaka (JP); Sumitomo Electric Fine Polymer, Inc., Sennan-gun, Osaka (JP)

(72) Inventors: Shingo Nakajima, Osaka (JE); Jun Sugawara, Osaka (JP); Akira Mizoguchi, Osaka (JP); Yusuke Uchiba, Sennan-gun (JP); Yoshimasa Suzuki, Sennan-gun (JP)

(73) Assignees: Sumitomo Electric Industries, Ltd., Osaka-shi, Osaka (JP); Sumitomo Electric Fine Polymer, Inc., Sennan-gun, Osaka (JP)

( * ) Notice: Subject to any disclaimer, the term of this patent is extended or adjusted under 35 U.S.C. 154(b) by 125 days.

This patent is subject to a terminal disclaimer.

(21) Appl. No.: 13/768,581

(22) Filed: Feb. 15, 2013

(65) Prior Publication Data

US 2013/0225380 A1 Aug. 29, 2013

Related U.S. Application Data

(63) Continuation-in-part of application No. 12/995,745, filed as application No. PCT/JP2009/054580 on Mar. 10, 2009, now Pat. No. 8,401,451.

(30) Foreign Application Priority Data

Jun. 9, 2008 (JP) .................. 2008-150938

(51) Int. Cl.
*G03G 15/20* (2006.01)
*F16C 13/00* (2006.01)

(52) U.S. Cl.
CPC ............ *F16C 13/00* (2013.01); *G03G 15/2057* (2013.01)
USPC ........................................ 399/333

(58) Field of Classification Search
USPC ........................................ 399/333
See application file for complete search history.

(56) References Cited

U.S. PATENT DOCUMENTS 5,468,584 A 11/1995 Go et al.
5,714,248 A 2/1998 Lewis

FOREIGN PATENT DOCUMENTS

JP 06-092636 A 4/1994
JP 07-076025 A 3/1995

(Continued)

*Primary Examiner* — G. M. Hyder
(74) *Attorney, Agent, or Firm* — Drinker Biddle & Reath LLP (57) ABSTRACT

Provided is a roller for an image-forming apparatus which includes a base member and a fluororesin layer provided on an outer circumferential surface of the base member directly or through an adhesive layer, the roller for an image-forming apparatus being characterized in that the fluororesin layer contains phosphorus-doped tin oxide. The roller for an image-forming apparatus has a surface resistance capable of stably and effectively preventing the occurrence of electrostatic offsets, and also has an excellent releasing property. Also provided is a process for producing the roller for an image-forming apparatus, characterized by including the steps of applying a fluororesin dispersion containing an aqueous dispersion of phosphorus-doped tin oxide onto a base member or an adhesive layer disposed on an outer circumferential surface of the base member, and then sintering the fluororesin.

12 Claims, 2 Drawing Sheets

(56) References Cited

FOREIGN PATENT DOCUMENTS

| | | | |
|---|---|---|---|
| JP | 08-220907 A | 8/1996 |
| JP | 08-328408 A | 12/1996 |
| JP | 10-213948 A | 8/1998 |
| JP | 10-293487 A | 11/1998 |
| JP | 2000-147928 A | 5/2000 |
| JP | 2001-125404 A | 5/2001 |
| JP | 2003-082231 A | 3/2003 |
| JP | 2004-086202 A | 3/2004 |
| JP | 2007-253425 A | 10/2007 |

ROLLER FOR IMAGE-FORMING APPARATUS AND PROCESS FOR PRODUCING THE SAME

CROSS REFERENCE TO RELATED APPLICATIONS

This application is a Continuation-in-Part application of copending application Ser. No. 12/995,745, filed on Dec. 2, 2010, which is a national stage application of PCT Application No. PCT/JP2009/054580 filed on Mar. 10, 2009, designating the U.S.A., which claims priority to Japanese Patent Application No. P2008-150938 filed Jun. 9, 2008, the entire contents of each of which are incorporated by reference herein in their entirety.

TECHNICAL FIELD

The present invention relates to a roller for an image-forming apparatus, which includes a base member and a fluororesin layer provided on an outer circumferential surface of the base member and which is used in a copying machine or a printer, and a process for producing a roller for an image-forming apparatus.

BACKGROUND ART

In image-forming apparatuses such as copy machines, facsimiles, and printers including laser beam printers, a method has been widely employed in which copy paper on which a toner image is formed is passed between a heating fixing roller provided with a heating source inside and a pressure roller, whereby unfixed toner is melted by heating and the toner image is fixed onto the paper. As the heating fixing roller, a roller which includes a base member composed of a metal tube or a heat-resistant plastic tube, such as a polyimide tube, and a fluororesin layer (release layer) for preventing adhesion of molten toner, the fluororesin layer being provided on an outer circumferential surface of the base member, is widely used. In addition, in image-forming apparatuses, a variety of rotary members (rollers or belts) such as developing rollers, charged rollers, and transfer rollers in developing units, and rollers for holding an endless belt, paper ejection rollers, dust removing rollers, and paper feed rollers in other parts are used.

In recent years, with the increase in copying speed, scattering of a toner image on copy paper due to the occurrence of static electricity, and occurrence of electrostatic offsets have become more of a problem. The electrostatic offsets are divided into two types: a total surface offset and a peeling offset. The total surface offset easily occurs when the surface resistance of the release layer is low, while the peeling offset easily occurs when the surface resistance is high. In order to suppress both types of offsets, the acceptable range of surface resistance is required to be very narrow. Therefore, in order to prevent the problem described above, the surface resistance of the fluororesin layer (release layer) is required to be precisely controlled in the rollers for an image-forming apparatus such as heating fixing rollers or pressure rollers.

In order to decrease the surface resistance of the rollers for an image-forming apparatus such as heating fixing rollers or pressure rollers, a method has been conceived in which a conductive material, such as carbon black, metal powder, or graphite, is added to the release layer (Patent Document 1). However, when metal powder is used, because of reaction with water in a dispersion (coating material) for forming the fluororesin layer (release layer), oxidation due to high-temperature firing during formation of the fluororesin layer (release layer), or the like, physical properties, such as a releasing property of the fluororesin, are easily degraded, which is a problem. On the other hand, in the case of carbon black or graphite, the dispersion state easily varies and aggregation (percolation) easily occurs. Therefore, it is difficult to stably obtain the intended surface resistance, thus making it difficult to satisfy recent requirements.

As a method of preventing aggregation of carbon black or graphite, use of a semiconductive inorganic substance as an electric potential stabilizer together with carbon black or graphite is known. Patent Document 1 discloses combined use of about 0.3% to 8% by weight of a good conductive substance (conductive material), such as carbon black or graphite, and 5% to 50% by weight of a semiconductive inorganic substance, such as titanium oxide, iron oxide, aluminum hydroxide, talc, barium titanate, antimony oxide, silica, or calcium carbonate, and by the combined use, aggregation of carbon black, graphite, or the like can be prevented to a certain degree (Patent Document 1, paragraph 0024).

Patent Document 1: Japanese Unexamined Patent Application Publication No. 2001-125404

DISCLOSURE OF INVENTION

Problems to be Solved by the Invention

However, in order to prevent aggregation of carbon black, graphite, or the like by using a semiconductive inorganic substance together therewith, it is necessary to add the semiconductive inorganic substance in the amount described above, i.e., about 5% to 50% by weight. As a result, the mixing amount of the semiconductive inorganic substance in the fluororesin layer (release layer) increases, thus decreasing the releasing property of the fluororesin, which is a problem.

It is an object of the present invention to provide a roller for an image-forming apparatus which has a surface resistance within the acceptable control range, that is, a surface resistance capable of stably and effectively preventing the occurrence of electrostatic offsets, and which also has an excellent releasing property, and a process for producing a roller for an image-forming apparatus.

Means for Solving the Problems

As a result of diligent research to solve the problems, the present inventors have found that, by using an aqueous dispersion of phosphorus-doped tin oxide as a conductive material to be added to the fluororesin layer (release layer), stable surface resistance (charging characteristics) can be easily obtained, and that since a large amount of an inorganic semiconductive substance is not required to be used together therewith, a roller for an image-forming apparatus having an excellent releasing property can be produced. Thus, the present invention has been completed.

That is, the present invention provides, as Claim 1, a roller for an image-forming apparatus including a base member and a fluororesin layer provided on an outer circumferential surface of the base member directly or through an adhesive layer, the roller for an image-forming apparatus being characterized in that the fluororesin layer contains phosphorus-doped tin oxide.

The roller for an image-forming apparatus includes a base member and a fluororesin layer provided on an outer circumferential surface of the base member directly or through an adhesive layer as in a roller for an image-forming apparatus which has been conventionally used in a copying machine or a printer, but is characterized in that the fluororesin layer contains phosphorus-doped tin oxide as a conductive material.

Since phosphorus-doped tin oxide has good dispersibility and has a lower degree of aggregation than carbon black or graphite, it is easy to obtain stable surface resistance (charging characteristics) of the roller. Consequently, the roller for an image-forming apparatus of the present invention can have a surface resistance within a very narrow acceptable control range that has been required in recent years. As a result, it is possible to suppress both a total surface offset and a peeling offset.

Furthermore, since a large amount of an inorganic semiconductive substance or the like is not required to prevent aggregation, the content of the inorganic semiconductive substance can be reduced, and it is possible to suppress a decrease in the releasing property due to addition of the inorganic semiconductive substance. Consequently, in the roller for an image-forming apparatus, occurrence of electrostatic offsets is suppressed, high-speed and excellent copying can be achieved, and excellent mechanical characteristics, such as wear resistance, can be exhibited.

Although antimony-doped tin oxide or the like is also known (Japanese Unexamined Patent Application Publication No. 2007-253425), it has environmental problems. However, phosphorus-doped tin oxide does not have environmental problems, and can have better conductive properties than those in the case where pure tin oxide is used as the conductive material.

Examples of the fluororesin constituting the fluororesin layer include polytetrafluoroethylene (PTFE), tetrafluoroethylene-perfluoroalkylvinyl ether copolymers (PFA), tetrafluoroethylene-hexafluoropropylene copolymers (FEP), and ethylene-tetrafluoroethylene copolymers (ETFE). These can be used alone or in a mixture thereof.

The fluororesin layer can be formed by a method in which a varnish containing a fluororesin or a fluororesin dispersion is applied onto a base member (polyimide tube) produced as described above or an adhesive layer, which will be described below, formed on the base member, followed by sintering. The present invention is characterized in that the fluororesin layer contains phosphorus-doped tin oxide, and the phosphorus-doped tin oxide can be incorporated by adding an aqueous dispersion (aqueous sol) of phosphorus-doped tin oxide to a varnish containing a fluororesin or a fluororesin dispersion.

An invention according to Claim 2 relates to the roller for an image-forming apparatus according to Claim 1, characterized in that the roller is one of a pressure roller, a developing roller, a charged roller, a transfer roller, a roller for holding an endless belt, a paper ejection roller, a dust removing roller, and a paper feed roller. An invention according to Claim 3 relates to the roller for an image-forming apparatus according to Claim 1, characterized in that the roller is a pressure roller.

An invention according to Claim 4 relates to the roller for an image-forming apparatus according to Claim 1, characterized in that the surface electrical resistivity of the fluororesin layer is in a range of $1 \times 10^9$ to $1 \times 10^{16} \Omega/\square$. The surface electrical resistivity of the fluororesin layer adjusted by addition of phosphorus-doped tin oxide is preferably in the range described above. By setting the surface electrical resistivity within this range, it is possible to prevent scattering of a toner image on copy paper due to the occurrence of static electricity, and it is possible to suppress both a total surface offset and a peeling offset. The surface electrical resistivity is more preferably in a range of $1 \times 10^{10}$ to $1 \times 10^{16} \Omega/\square$, and still more preferably in a range of $\times 10^{10}$ to $1 \times 10^{15} \Omega/\square$. In the case where a conductor, such as carbon black or graphite, is used, it is difficult to adjust the surface electrical resistivity to such a narrow range. However, by using phosphorus-doped tin oxide as a conductor, precise adjustment to this range is facilitated.

The phosphorus-doped tin oxide is tin oxide containing phosphorus, and for example, a commercially available one, such as trade name CELNAX CX-S301H (manufactured by Nissan Chemical Industries, Ltd.), can be used. The aqueous dispersion (aqueous sol) of phosphorus-doped tin oxide can be produced, for example, by a sol-gel method. The aqueous dispersion (aqueous sol) produced by the sol-gel method has excellent dispersibility, and thus is preferably used. The content of tin oxide in the aqueous dispersion of phosphorus-doped tin oxide is usually about 30% although not particularly limited thereto. The particle size of tin oxide is not particularly limited, but is usually 5 to 20 nm.

An invention according to Claim 5 relates to the roller for an image-forming apparatus according to Claim 1, characterized in that the content of the phosphorus-doped tin oxide in the fluororesin layer is 3% to 50% by weight. The content of the phosphorus-doped tin oxide is preferably in the range that allows the surface electrical resistivity of the fluororesin layer to be in the range described above. Although the preferable range varies depending on the amount of phosphorus doped in tin oxide, or the like, in the case where a commercially available phosphorus-doped tin oxide, such as CELNAX CX-S301H, is used, the content of the phosphorus-doped tin oxide in the fluororesin layer is preferably 3% to 50% by weight, more preferably 4% to 30% by weight, and still more preferably 5% to 15% by weight.

An invention according to Claim 6 relates to the roller for an image-forming apparatus according to Claim 1, characterized in that the thickness of the fluororesin layer is in a range of 5 to 20 μm. When the thickness of the fluororesin layer is less than 5 μm, a problem easily occurs in terms of durability of the roller. On the other hand, when the thickness exceeds 20 μm, thermal conductivity of the polyimide tube roller as a whole degrades, and a problem easily occurs in terms of a fixing property (that is, normal fixing is not easily performed).

An invention according to Claim 7 relates to the roller for an image-forming apparatus according to Claim 1, characterized in that the base member is tubular.

An invention according to Claim 8 relates to the roller for an image-forming apparatus according to Claim 1, characterized in that the base member is columnar.

Examples of the tubular base member constituting the roller for an image-forming apparatus of the present invention include a base member composed of a tube, such as a metal tube or a heat-resistant plastic tube; and a base member in which an elastic layer, e.g., a rubber layer, is provided on an outer circumferential surface of a tube, such as a metal tube or a heat-resistant plastic tube. Examples of the columnar base member constituting the roller for an image-forming apparatus of the present invention include a base member composed of a column, such as a metal column or a heat-resistant plastic column; and a base member in which an elastic layer, e.g., a rubber layer, is provided on an outer circumferential surface of a column, such as a metal column or a heat-resistant plastic column. An invention according to Claim 9 relates to the roller for an image-forming apparatus according to Claim 7, characterized in that the tubular base member is a base member composed of a metal tube or a heat-resistant plastic tube, or a base member composed of a metal tube or a heat-resistant plastic tube coated with an elastic layer. An invention according to Claim 10 relates to the roller for an image-forming apparatus according to Claim 8, characterized in that the columnar base member is a base member composed of a metal column or a heat-resistant plastic column, or a base member composed of a metal column or a heat-resistant plastic column coated with an elastic layer As the metal tube, for example, a SUS tube may be used. Examples of the heat-resistant plastic tube include a polyimide tube. As for the metal column, for example, an aluminum column, an aluminum alloy column, an iron column, a stainless steel column and the like may be used. Among the tubes, a polyimide tube is preferable because it excels in heat resistance, dimensional stability, chemical properties, and mechanical properties. An invention according to Claim 11 relates to the roller for an image-forming apparatus according to Claim 7, characterized in that the tubular base member is a base member composed of a polyimide tube or a base member composed of a polyimide tube coated with an elastic layer.

The polyimide tube is a tubular article composed of a polyimide resin composition. For example, a polyimide tube manufactured by a manufacturing method described in Japanese Unexamined Patent Application Publication No. 7-76025 or the like may be used. The thickness or the like of the polyimide tube can be appropriately selected according to the desired mechanical strength, use, and the like, but is preferably about 20 to 500 μm, when used in a normal copying machine, in order to achieve heat resistance, dimensional stability, chemical properties, and mechanical properties.

There may be a case where a layer other than the elastic layer is provided on the tube. For example, in the case of a base member in which a tube is coated with an elastic layer, a bonding agent layer may be provided between the elastic layer and a metal tube or a heat-resistant plastic tube.

The fluororesin layer may be formed directly on the base member. Alternatively, an adhesive layer may be provided as an intermediate layer in order to improve adhesiveness between the base member and the fluororesin layer, and the fluororesin layer may be formed on the adhesive layer. In view of heat resistance, the adhesive layer is preferably composed of a heat-resistant resin. As the resin constituting the adhesive layer, for example, a mixture of a fluororesin and a polyamide-imide resin, a mixture of a fluororesin and a polyether sulfone resin, or the like is preferably used, although not particularly limited. The thickness of the adhesive layer is usually 0.1 to 20 μm, and preferably about 1 to 10 μm.

The roller for an image-forming apparatus of the present invention can be produced by a process including the steps of applying a fluororesin dispersion containing an aqueous dispersion of phosphorus-doped tin oxide onto a base member or an adhesive layer disposed on an outer circumferential surface of the base member, and then sintering the fluororesin in the dispersion. The present invention also provides, as Claim 12, this production process.

The base member and the adhesive layer can be produced by known methods, such as the method described in Japanese Unexamined Patent Application Publication No. 7-76025. Application of the fluororesin dispersion can be performed, for example, by a method in which a base member or a base member having an adhesive layer provided on an outer circumferential surface thereof is immersed in a fluororesin dispersion and then removed from the dispersion. As the fluororesin dispersion, a dispersion prepared by dispersing fluororesin particles in a dispersion medium obtained by mixing a small amount of an organic solvent in water can be used.

Advantageous Effects of Invention

A roller for an image-forming apparatus of the present invention has a surface resistance that can stably prevent the occurrence of electrostatic offsets effectively, and excels in a releasing property and wear resistance. Furthermore, the roller for an image-forming apparatus of the present invention can be easily produced by a production process of the present invention, in which problems, such as degradation in a releasing property and wear resistance, do not occur.

BEST MODE FOR CARRYING OUT THE INVENTION

A best mode for carrying out the present invention will be described below. However, it is to be understood that the scope of the present invention is not limited to the best mode.

Figure 1:
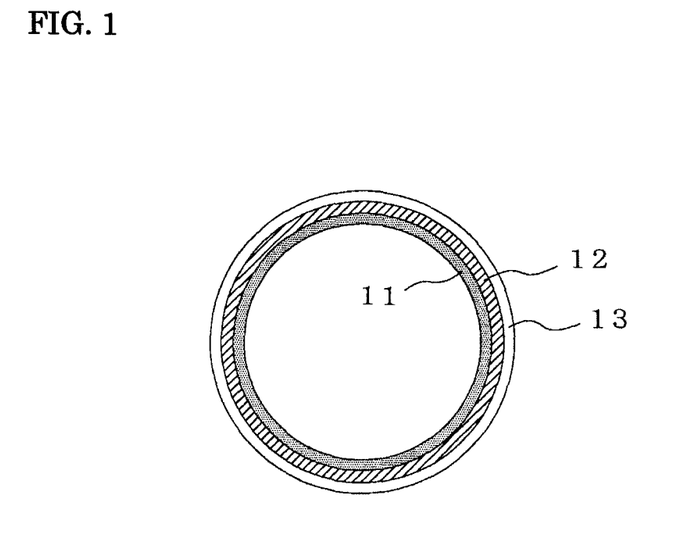
FIG. 1 is a cross-sectional view showing an example of a roller for an image-forming apparatus of the present invention.

FIG. 1 is a cross-sectional view showing an example of a roller for an image-forming apparatus of the present invention in which a fluororesin layer 13 is formed through an adhesive layer 12 on an outer circumferential surface of a base member 11 composed of a polyimide resin (polyimide tube). Furthermore, as an intermediate layer, a resin layer other than the adhesive layer, or a rubber layer may be additionally disposed.

As the polyimide resin constituting the base member 11, a known thermoplastic polyimide resin or thermosetting polyimide resin may be used. For example, a polyimide resin can be obtained by reacting an aromatic tetracarboxylic dianhydride with an aromatic diamine component in an organic polar solvent. Examples of the aromatic tetracarboxylic acid include pyromellitic dianhydride, 3,3',4,4'-biphenyltetracarboxylic dianhydride, 3,3',4,4'-benzophenonetetracarboxylic dianhydride, 2,3,4,4'-biphenyltetracarboxylic dianhydride, 2,3,6,7-naphthalenetetracarboxylic dianhydride, 1,2,5,6-naphthalenetetracarboxylic dianhydride, and 2,2-bis(3,4-dicarboxyphenyl)ether dianhydride. Alternatively, tetracarboxylic esters thereof and mixtures of the tetracarboxylic acids described above may be used. Meanwhile, examples of the aromatic diamine component include para-phenylenediamine, meta-phenylenediamine, 4,4'-diaminodiphenyl ether, 4,4'-diaminophenylmethane, benzidine, 3,3'-diaminodiphenylmethane, 3,3'-dimethoxybenzidine, 4,4'-diaminodiphenylpropane, and 2,2-bis[4-(4-aminophenoxy)phenyl]propane.

In the case where the polyimide resin is a thermosetting polyimide resin, first, a polyimide precursor (also referred to as "polyamide acid" or "polyamic acid") is synthesized. An organic solvent solution of the polyimide precursor (polyimide varnish) is applied to an outer surface or an inner surface of a cylindrical core, and after drying, heating is performed to a maximum temperature of about 350° C. to 450° C. The polyamide acid is made to undergo dehydration ring closure by heating to form a polyimide, which is then cured. A tubular base member (polyimide tube) can be thereby obtained.

Examples of the organic polar solvent to be used include dimethylacetamide, dimethylformamide, N-methyl-2-pyrrolidone, phenol, and O-, M-, and P-cresols. A hydrocarbon, such as xylene, hexane, or toluene, may be mixed with these organic polar solvents. Furthermore, a thermal conduction improving agent, such as boron nitride, carbon powder, or metal powder, may be incorporated into the polyimide precursor solution.

As the adhesive layer 12, a resin layer composed of the material described above can be used. Furthermore, when a conductive filler is incorporated into the adhesive layer 12, the effect of shielding the inner surface of a fixing belt against triboelectric charging and the antistatic effect for the outer surface can be enhanced, and thus offsets can be more effectively prevented, which is preferable. As the conductive filler for the adhesive layer, the same conductive filler as that used for the outer layer can be used. The amount of the conductive filler to be added is usually 0.5% to 10% by weight, and preferably about 1% to 5% by weight.

The fluororesin layer 13 is composed of the fluororesin exemplified above and contains phosphorus-doped tin oxide. The fluororesin layer 13 may be further incorporated with conductive carbon black, such as Ketjenblack; a conductive filler, such as metal powder, e.g., aluminum; and a semiconductive inorganic substance, such as titanium oxide, iron oxide, aluminum hydroxide, talc, barium titanate, antimony oxide, silica, or calcium carbonate. However, in the present invention, the amount of addition of a semiconductive inorganic substance can be decreased, and as a result, the problem of a decrease in the releasing property can be prevented.

In the case where the roller for an image-forming apparatus has a rough surface, a so-called white spots phenomenon, in which unfixed toner falls off from copy paper, thus degrading image quality, easily occurs. As a result, a problem, such as degradation in picture image definition or degradation in image quality, easily occurs. Accordingly, the surface roughness of the fluororesin layer 13 is preferably small, and specifically, preferably 3.5 μm or less in terms of (Rz). Consequently, as the phosphorus-doped tin oxide and the filler (an inorganic semiconductive substance, a good conductive substance, or the like) to be incorporated into the fluororesin layer 13, those having an average particle size of 3 μm or less are preferably used.

The fluororesin layer of the present invention is suitably applied to a pressure roller based on a rubber-covered roller produced by providing a silicone rubber compound prepared by mixing resin microballoons with a silicone rubber on the outer periphery of a base member (core), and curing the compound by heating at a temperature lower than the softening point of the resin constituting the outer shells of the resin microballoons. The method for forming a rubber-covered roller is not particularly limited. An example of a method for forming the roller includes arranging a core in an inner space of a cylindrical metal mold, injecting a silicone rubber compound between the core and an inner wall of the metal mold, and then curing the silicone rubber by heating the metal mold.

Figure 2:
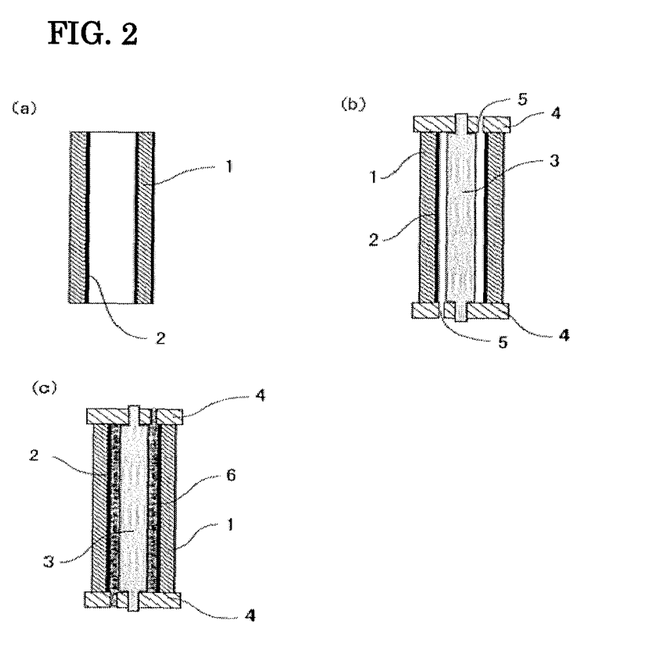
FIG. 2 includes cross-sectional views illustrating an example of a method for producing a pressure roller of the present invention.

Next, as an example of this method, steps of forming a pressure roller will be described with reference to FIG. 2. FIG. 2 includes cross-sectional views illustrating the production process. Reference numeral 1 in FIG. 2(a) denotes a metal cylinder (cylindrical metal mold). First, a fluororesin dispersion that forms the fluororesin layer of the present invention is applied onto the inner surface of the cylindrical metal mold and then cured to form a fluororesin layer 2. The fluororesin layer 2 functions as a surface releasing layer after the formation of a pressure roller.

After the fluororesin layer 2 is formed on the inner surface of the cylindrical metal mold 1, a core 3 is arranged at the center of the inner space of the cylindrical metal mold 1, as illustrated in FIG. 2(b). The core 3 is a column composed of a metal. Besides such a column composed of a metal, a core composed of a material that is generally used as a core of a pressure roller, for example, a resin having high heat resistance, chemical resistance, mechanical strength, etc., such as a polyimide resin, can also be used.

Openings at both ends of the cylindrical metal mold 1 are closed by covers 4. Each of the covers 4 has a hole for holding an end of the core 3, the hole being formed at the center of the cover 4. The core 3 is held by the holes at the center of the inner space of the cylindrical metal mold 1, and a gap having a certain distance is formed between the outer periphery of the core 3 and the inner periphery of the cylindrical metal mold 1 (fluororesin layer 2).

After the openings at both ends of the cylindrical metal mold 1 are closed by the covers 4, a silicone rubber compound prepared by mixing resin microballoons with a silicone rubber is injected into the gap. An inlet 5 for injecting the silicone rubber compound is provided in each of the covers 4.

Before the silicone rubber compound is injected, a primer for improving the adhesive strength between the fluororesin layer 2 (surface releasing layer) and a silicone rubber (rubber elastic layer 6) may be applied onto the surface (inner surface) of the fluororesin layer 2, and dried. A primer for improving the adhesive strength between the silicone rubber (rubber elastic layer 6) and the core 3 may be applied onto the surface of the core 3, and dried.

FIG. 2(c) illustrates a state where the silicone rubber compound is injected from the inlets 5 into the gap. After the silicone rubber compound is injected, the whole cylindrical metal mold 1 is heated to cure the silicone rubber compound (primary vulcanization), thus forming a rubber elastic layer 6 containing the resin microballoons dispersed therein. The heating is conducted at a temperature lower than the softening point of the outer shells of the resin microballoons. If the heating temperature is equal to or higher than the softening point, thermal deformation and breaking of the balloons may occur, and a uniform sponge foam may not be formed. In the case where a commercially available product, such as Matsumoto Microsphere F series, is used as the resin microballoons, this heating is preferably performed at about 150° C. for about one hour.

Figure 3:
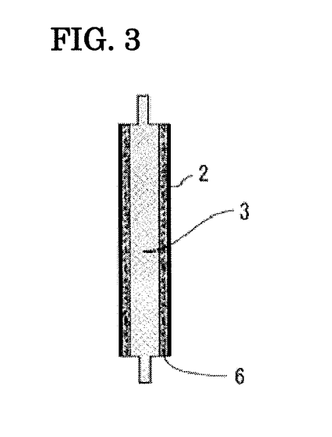
FIG. 3 is a cross-sectional view illustrating a pressure roller produced by the method illustrated in FIG. 2, which is taken along a plane including the axis of the roller.
Figure 4:
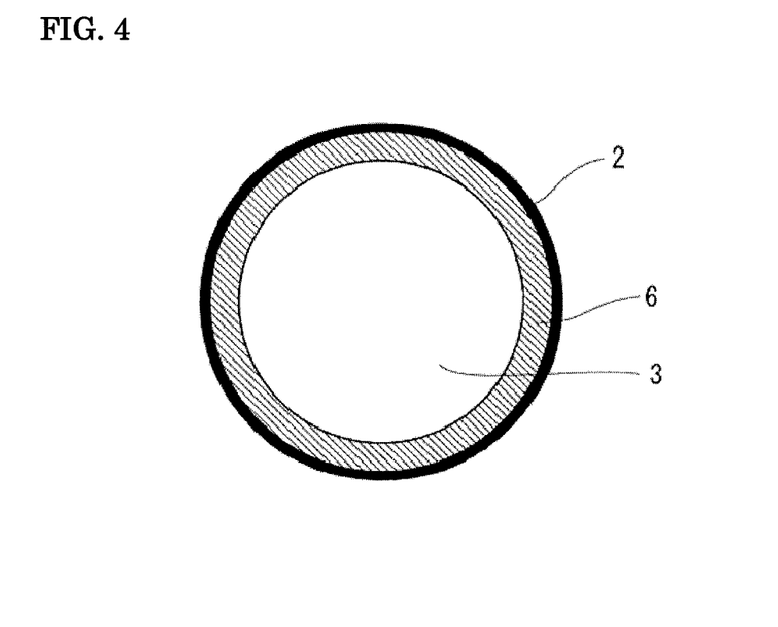
FIG. 4 is a cross-sectional view illustrating a pressure roller produced by the method illustrated in FIG. 2, which is taken along a plane perpendicular to the axis of the roller.

After the formation of the rubber elastic layer 6, the covers 4 and the cylindrical metal mold 1 are removed (demolded). Thus, a pressure roller of the present invention is produced. FIGS. 3 and 4 are cross-sectional views each illustrating a pressure roller produced by the method illustrated in FIG. 2. FIG. 3 is a cross-sectional view taken along a plane including the axis of the roller. FIG. 4 is a cross-sectional view taken along a plane perpendicular to the axis of the roller.

As illustrated in FIGS. 3 and 4, the pressure roller includes the core 3, the rubber elastic layer 6 disposed on the outer periphery of the core 3, and the fluororesin layer 2 that covers the outer periphery of the rubber elastic layer 6. The fluororesin layer 2 is a surface releasing layer. The surface releasing layer is provided for the purpose of providing a releasing property to the surface of the pressure roller so as to prevent a toner from adhering to the pressure roller and to prevent a sheet from winding around the pressure roller. The surface releasing layer is composed of a fluororesin having a high releasing property, such as a PFA.

After the pressure roller is removed from the mold, the pressure roller is preferably heated at a temperature equal to or higher than the softening point of the outer shells of the resin microballoons (secondary vulcanization). In the case where a commercially available product, such as Matsumoto Microsphere F series, is used as the resin microballoons, this heating is preferably performed at about 240° C. for about two hours. The resin microballoons are subjected to thermal shrinkage and break due to the heating, and pores are left at positions where the resin microballoons existed. When the resin microballoons are left in the pressure roller and the resulting roller is used as a pressure roller, the fixing performance of the roller may vary with thermal history. However, this problem is prevented by breaking the resin microballoons, and thus the roller can be stably used.

The curing of the silicone rubber is completed by the heating. In addition, air bubbles can be made to be continuous air bubbles by breaking the resin microballoons. The term "continuous air bubbles" refers to air bubbles (pores) connected to each other so that air can pass therethrough, the air bubbles being dispersed in a silicone rubber. In the case of independent air bubbles where the pores in a silicone rubber sponge are independent from each other and air cannot pass through the air bubbles, when air in the air bubbles is expanded by heating, the volume of the air bubbles, and furthermore, the volume of the silicone rubber sponge increase. Accordingly, the diameter of a roller including an elastic layer formed using the silicone rubber sponge is easily changed by heating, and thus continuous air bubbles are preferred.

In the method described above, the fluororesin layer 2 is formed on the inner surface of the cylindrical metal mold 1, the core 3 is then arranged at the center of the inner space of the cylindrical metal mold 1, and the openings at both ends of the cylindrical metal mold 1 are closed by the covers 4. Alternatively, a pressure roller may be prepared by arranging the core 3 and the covers 4, injecting the silicone rubber, performing curing (primary vulcanization), removing the mold, and performing secondary vulcanization as in the above method without forming the fluororesin layer 2 on the inner surface of the cylindrical metal mold 1, and the fluororesin layer 2 (surface releasing layer) may then be formed by covering the surface of the roller (surface of the rubber elastic layer 6) with a fluororesin tube prepared by sintering a fluororesin dispersion of the present invention, and performing heating (for example, at about 290° C. for about 10 minutes). In this method, before the surface of the roller (surface of the rubber elastic layer 6) is covered with the fluororesin tube, a primer for improving the adhesive strength between the fluororesin tube and the silicone rubber (rubber elastic layer 6) may be applied onto the silicone rubber, and dried.

EXAMPLES

Examples 1 to 8 and Comparative Examples 1 to 4

As a polyimide precursor varnish, which was a raw material for a base member, a varnish prepared by dissolving "U-Varnish S-301" (specific gravity 1.446, manufactured by Ube Industries, Ltd.) in a solvent (N-methylpyrrolidone) at a concentration of 18% (hereinafter abbreviated as "U varnish S") was used.

A nozzle (discharge port) located at a feed portion of a dispenser was brought into contact with an outer surface of a core composed of aluminum cylinder having an outer diameter of 20 mmϕ, the outer surface of which was coated with ceramic. While rotating the core and moving the nozzle in the rotation axis direction of the core at a constant rate, the U varnish S was constantly fed from the nozzle at the feed portion of the dispenser to thereby apply the polyimide precursor varnish onto the outer surface of the core. As the nozzle at the feed portion of the dispenser, a tube made of PTFE with an inner diameter of 2 mm and an outer diameter of 4 mm was used. The nozzle was moved from a position 20 mm away from the right end of the core (at the time of start of feeding) to a position 20 mm away from the left end of the core (at the time of stop of feeding). After application, while rotating the core, heating was performed stepwise to 400° C., followed by cooling and solidification. Thereby, a tubular body including a base member composed of a polyimide resin was obtained. The base member had a thickness of 80 μm, an outer diameter of 24.2 mm, and a length of 233 mm.

The tubular body thus obtained was coated by immersion in a primer liquid for fluororesin (855-040 CONDUCTIVE PRIMER BLACK manufactured by E.I. du Pont de Nemours and Company). Then, heating was performed at a temperature of 200° C. for 30 minutes to form an adhesive layer with a thickness of 4 μm. The tubular body provided with the adhesive layer was immersed in a fluororesin dispersion, which was obtained as described below, and then removed from the dispersion, and the fluororesin was sintered to form a fluororesin layer.

[Fluororesin Dispersion]

An aqueous sol of phosphorus-doped tin oxide (manufactured by Nissan Chemical Industries, Ltd., CELNAX CX-S301H) was added to a fluororesin (PTFE: manufactured by DuPont Fluorochemical Company, EMX-62-1) at the ratio shown in Table I or II, and as necessary, a filler (carbon black: LION PASTE 310A manufactured by Lion Corporation, or titanium oxide: manufactured by Leica Corporation, TITANIX JR-600A) was added at the ratio shown in Table I or II, followed by mixing, to obtain each fluororesin dispersion. As comparative examples, fluororesin dispersions in which pure tin oxide, not doped with phosphorus, was added instead of an aqueous sol of phosphorus-doped tin oxide (Comparative Examples 3 and 4), and fluororesin dispersions in which an aqueous sol of phosphorus-doped tin oxide was not added (Comparative Examples 1 and 2) were also obtained.

With respect to the resulting tubular bodies each having a fluororesin layer on the surface thereof, surface electrical resistivity and a variation thereof were measured by the methods described below, and a fixing performance test and an offset test were performed. The results thereof are shown in Tables I and II.

(1) Measurement of Surface Electrical Resistivity:

Measurement was performed using an ultra-high resistance/microammeter (R8340A manufactured by Advantest Corporation) and a ring double electrode as a probe, under an applied voltage of 50 V.

(2) Measurement of Variation of Surface Electrical Resistivity

Surface electrical resistivity was measured on 10 samples, and a difference between the maximum value and the minimum value was defined as a variation.

(3) Fixing Performance Test

The tubular body described above (hereinafter referred to as the "tubular body") was fixed on an aluminum plate. Next, the tubular body was coated with toner and heating was performed until the temperature of the sample reached 150° C. Then, paper was pressed and rubbed against the toner five times, and the paper was removed. It was checked whether or not the toner was transferred to the paper, and evaluation was performed on the basis of the following criteria:

⊚: The toner is completely transferred to the paper.

○: Most of the toner is transferred to the paper.

x: A large amount of the toner remains on the tubular body.

(4) Offset Test

The tubular body was built into a fixing unit, and occurrence or non-occurrence of offsets was evaluated on the basis of the following criteria:

○: No offsets occur.

x: Offsets occur.

TABLE I

| | Example 1 | Example 2 | Example 3 | Example 4 | Example 5 | Example 6 |
|---|---|---|---|---|---|---|
| Thickness of fluororesin layer μm | 10 | 10 | 10 | 10 | 10 | 10 |

TABLE I-continued

|  |  | Example 1 | Example 2 | Example 3 | Example 4 | Example 5 | Example 6 |
|---|---|---|---|---|---|---|---|
| Phosphorus-doped tin oxide | Type | CELNAX CX-S301H | | | | | |
|  | Addition amount wt % | 5 | 7 | 8 | 9 | 12 | 3 |
| Pure tin oxide addition amount wt % | | — | — | — | — | — | — |
| Carbon black addition amount wt % | | — | — | — | — | — | 0.2 |
| Titanium oxide addition amount wt % | | — | — | — | — | — | — |
| Surface electrical resistivity $\Omega/\square$ | | $1.2 \times 10^{14}$ | $1.0 \times 10^{14}$ | $8.2 \times 10^{13}$ | $5.1 \times 10^{13}$ | $2.0 \times 10^{13}$ | $1.0 \times 10^{12}$ |
| Variation | | ±one order of magnitude | ±one order of magnitude | ±one order of magnitude | ±one order of magnitude | ±one order of magnitude | ±one order of magnitude |
| Fixing performance | | ○ | ◎ | ◎ | ◎ | ○ | ○ |
| Offset test | | ○ | ○ | ○ | ○ | ○ | ○ |

|  |  | Example 7 | Example 8 | Comparative Example 1 | Comparative Example 2 | Comparative Example 3 | Comparative Example 4 |
|---|---|---|---|---|---|---|---|
| Thickness of fluororesin layer μm | | 10 | 10 | 10 | 10 | 10 | 10 |
| Phosphorus-doped tin oxide | Type | CELNAX CX-S301H | CELNAX CX-S301H | — | — | — | — |
|  | Addition amount wt % | 12 | 20 | — | — | — | — |
| Pure tin oxide addition amount wt % | | — | — | — | — | 10 | 25 |
| Carbon black addition amount wt % | | — | — | 0.4 | 0.4 | — | 0.2 |
| Titanium oxide addition amount wt % | | 4 | 4 | 14 | 4 | — | — |
| Surface electrical resistivity $\Omega/\square$ | | $2.0 \times 10^{13}$ | $1.0 \times 10^{12}$ | $1.0 \times 10^{12}$ | $1.0 \times 10^{13}$ | $2.0 \times 10^{15}$ | $3.0 \times 10^{13}$ |
| Variation | | ± one order of magnitude | ± one order of magnitude | ± one order of magnitude | ± two orders of magnitude | ± one order of magnitude | ± one order of magnitude |
| Fixing performance | | ○ | ○ | ○ | ○ | ○ | ○ |
| Offset test | | ○ | ○ | X | ○ | X | X |

In Examples 1 to 8 in which phosphorus-doped tin oxide is added to the fluororesin layer, proper surface resistance is obtained, and the variation in surface electrical resistivity is small. It is shown that excellent fixing performance is obtained, and electrostatic offsets can be stably suppressed.

On the other hand, in Comparative Example 1 in which carbon black and a semiconductive filler (titanium oxide) are added instead of tin oxide, and the filler addition amount is large, the releasing property is degraded, and electrostatic offsets occur. In Comparative Example 2 in which carbon black and a semiconductive filler (titanium oxide) are added instead of tin oxide, but the filler addition amount is small, it is shown that, although occurrence of electrostatic offsets is suppressed, the variation in surface electrical resistivity is large, and the surface electrical resistivity that can prevent electrostatic offsets cannot be obtained stably. In Comparative Example 3 in which pure tin oxide is used instead of phosphorus-doped tin oxide, it is not possible to obtain a proper surface electrical resistivity, and electrostatic offsets occur. Furthermore, in Comparative Example 3 in which pure tin oxide is used instead of phosphorus-doped tin oxide, and the amount of pure tin oxide is increased, the releasing property is degraded, and electrostatic offsets occur.

Examples 9 to 16

A fluororesin dispersion shown in Table III was applied onto the inner surface of a cylindrical stainless-steel mold having 32 mm outside diameter, wall thickness 6 mm, 260 mm in length and then was cured to form a fluororesin layer. A primer (KE-1880, manufactured by Shin-Etsu Chemical Co., Ltd.) was then applied onto the surface of the fluororesin layer and was dried to form an adhesive layer. A column base member (core) composed of iron was prepared. A primer (X-33-173, manufactured by Shin-Etsu Chemical Co., Ltd.) was applied onto the surface of the core and was dried to form an adhesive layer. The core was arranged at the center of the inner space of the cylindrical stainless-steel mold having the fluororesin layer and adhesive layer on the inner surface. A balloon rubber (X-34-2061-28H, a silicon rubber containing resin microballoons of about 3 parts in weight, manufactured by Shin-Etsu Chemical Co., Ltd.) was injected into a gap formed between the outer periphery of the core and the inner periphery of the cylindrical stainless-steel mold, and then was cured by performing heating at 130° C. for one hour (primary vulcanization) to form a rubber elastic layer. After the rubber elastic layer was formed, the mold was removed. The resulting roller was further heated at 230° C. for two hour (secondary vulcanization). Thus, a pressure roller of the present invention was produced. Each pressure roller of Examples 9 to 16 showed excellent releasing property and durability.

TABLE III

|  |  | Example9 | Example10 | Example11 | Example12 | Example13 | Example14 | Example15 | Example16 |
|---|---|---|---|---|---|---|---|---|---|
| Thickness of fluororesin layer μm | | 10 | 10 | 10 | 10 | 10 | 10 | 10 | 10 |
| Phosphorus-doped tin oxide | Type | | | | CELNAX CX-S301H | | | | |
| | Addition amount wt % | 5 | 7 | 8 | 9 | 12 | 3 | 12 | 20 |
| Pure tin oxide addition amount wt % | | — | — | — | — | — | — | — | — |
| Carbon black addition amount wt % | | — | — | — | — | — | 0.2 | — | — |
| Titanium oxide addition amount wt % | | — | — | — | — | — | — | 4 | 4 |
| Surface electrical resistivity Ω/□ | | $1.2 \times 10^{14}$ | $1.0 \times 10^{14}$ | $8.2 \times 10^{13}$ | $5.1 \times 10^{13}$ | $2.0 \times 10^{13}$ | $1.0 \times 10^{12}$ | $2.0 \times 10^{13}$ | $1.0 \times 10^{12}$ |
| Variation | | ±one order of magnitude | ±one order of magnitude | ±one order of magnitude | ±one order of magnitude | ±one order of magnitude | ±one order of magnitude | ±one order of magnitude | ±one order of magnitude |

The invention claimed is:

1. A roller for an image-forming apparatus comprising a base member and a fluororesin layer provided on an outer circumferential surface of the base member directly or through an adhesive layer, wherein the fluororesin layer contains phosphorus-doped tin oxide.

2. The roller for an image-forming apparatus according to claim 1, wherein the roller is one of a pressure roller, a developing roller, a charged roller, a transfer roller, a roller for holding an endless belt, a paper ejection roller, a dust removing roller, and a paper feed roller.

3. The roller for an image-forming apparatus according to claim 1, wherein the roller is a pressure roller.

4. The roller for an image-forming apparatus according to claim 1, wherein the surface electrical resistivity of the fluororesin layer is in a range of $1 \times 10^9$ to $1 \times 10^{16} \Omega/\square$.

5. The roller for an image-forming apparatus according to claim 1, wherein the content of the phosphorus-doped tin oxide in the fluororesin layer is 3% to 50% by weight.

6. The roller for an image-forming apparatus according to claim 1, wherein the thickness of the fluororesin layer is in a range of 5 to 20 μm.

7. The roller for an image-forming apparatus according to claim 1, wherein the base member is tubular.

8. The roller for an image-forming apparatus according to claim 7, wherein the tubular base member is a base member composed of a metal tube or a heat-resistant plastic tube, or a base member composed of a metal tube or a heat-resistant plastic tube coated with an elastic layer.

9. The roller for an image-forming apparatus according to claim 7, wherein the tubular base member is a base member composed of a polyimide tube or a base member composed of a polyimide tube coated with an elastic layer.

10. The roller for an image-forming apparatus according to claim 1, wherein the base member is columnar.

11. The roller for an image-forming apparatus according to claim 10, wherein the columnar base member is a base member composed of a metal column or a heat-resistant plastic column, or a base member composed of a metal column or a heat-resistant plastic column coated with an elastic layer.

12. A process for producing a roller for an image-forming apparatus comprising the steps of applying a fluororesin dispersion containing an aqueous dispersion of phosphorus-doped tin oxide onto a base member or an adhesive layer disposed on an outer circumferential surface of the base member, and then sintering the fluororesin.

* * * * *